United States Patent [19]

McKenna et al.

[11] 4,356,638
[45] Nov. 2, 1982

[54] LIFT TRUCK DIGITAL INCLINOMETER

[75] Inventors: William F. McKenna, Loves Park; Gerry A. Cwienkala, West Dundee, both of Ill.

[73] Assignee: Leveling Devices, Inc., Aurora, Ill.

[21] Appl. No.: 265,991

[22] PCT Filed: Oct. 22, 1980

[86] PCT No.: PCT/US80/01470
§ 371 Date: Oct. 22, 1980
§ 102(e) Date: Oct. 22, 1980

[87] PCT Pub. No.: WO82/01412
PCT Pub. Date: Apr. 29, 1982

[51] Int. Cl.³ .............................................. G01C 9/06
[52] U.S. Cl. ........................................ 33/333; 33/366; 33/DIG. 3
[58] Field of Search .............. 33/1 N, 1 L, 1 PT, 333, 33/366, 391, DIG. 3; 250/231 SE, 237 R, 553, 578

[56] References Cited

U.S. PATENT DOCUMENTS

| 886,333 | 4/1908 | Southward | 33/391 |
| 2,772,411 | 11/1956 | Cooper | 33/333 |
| 3,776,315 | 12/1973 | Gill et al. | 33/366 |
| 3,865,265 | 2/1975 | Brudi et al. | 33/366 |
| 4,154,000 | 5/1979 | Kramer | 33/366 |
| 4,159,577 | 7/1979 | Bergkvist | 33/366 |
| 4,167,818 | 9/1979 | Cantarella et al. | 33/366 |

FOREIGN PATENT DOCUMENTS

| 879918 | 6/1953 | Fed. Rep. of Germany | 33/366 |
| 260894 | 4/1949 | Switzerland | 33/391 |
| 655897 | 4/1979 | U.S.S.R. | 33/333 |

Primary Examiner—Richard R. Stearns
Attorney, Agent, or Firm—Kalish & Gilster

[57] ABSTRACT

Apparatus for digitally displaying inclination of a lift truck mast includes an inertial inclination sensor carried by the mast and a digital display module for operator viewing remote from the mast. The inclination sensor includes a disc pendulum pivoted for damping its movement, the disc having a wand extending from it for exaggerated movement about the pivot. A plurality of light responsive devices are provided for detecting the position of the wand for the purpose of determining the degrees of actual mast inclination with respect to a true vertical gravitational plumb line. A logic circuit interconnected with these devices decodes signals resulting from a predetermined pattern of illumination on them produced by the wand representative of the mast inclination, providing an encoded signal which is converted to display drive signals for driving a plurality of digital display devices of numeric readout, providing operator display of the actual degrees and increments of degrees of mast inclination from the vertical plumb line.

21 Claims, 10 Drawing Figures

LIFT TRUCK DIGITAL INCLINOMETER

BACKGROUND AND SUMMARY OF THE INVENTION

This invention relates to lift trucks and, more particularly, to a new system for providing a digital display of inclination of a lift truck mast from a vertical.

In the use of lift trucks, which typically have a mast having forks, a platen, or some other lifting device or devices for lifting a load, it is conventional to provide for operator control of inclination of the mast relative to vertical, thereby allowing the operator to adjust forward and backward tilt of the mast, for example. Front tilt may be required for picking up or depositing a load while rear tilt may be required for safe carrying of the load from one position to the other. It may be necessary also to control orientation of the load when picking up or depositing same.

In some specialized lift trucks, such as those used for glass handling wherein large sheets of glass must be transported from one place to another, it is very important to dispose the sheets of glass, as when they are being stacked, so that they are oriented very close to level. Otherwise,, a stack of sheets varying even a few degrees from vertical will become unstable causing the lower sheets to slip out from the stack resulting in an extremely dangerous condition resulting in broken glass and setting serious life threatening potential. Stacking may be required to be level within ±0.5°.

Although it has been proposed to provide an analog display of lift mast inclination, such as in the arrangements disclosed in Brudi U.S. Pat. No. 3,865,265 and Wilhelm U.S. Pat. No. 3,883,021, it is found that lift truck operators can more effectively provide accurate adjustment of the lift mast inclination, such as orienting it at precisely 0° inclination, if provided with a digital display of the inclination in degrees and increments of degrees. Also, analog arrangements have been prone to certain errors such as resulting from aging of components, drift, out-of-tolerance conditions, offset errors and so forth.

A further problem which has plagued prior art inclinometers is proneness to swinging or oscillation of pendulums or other masses used to detect alignment. To reduce such oscillation, it has been proposed, as in the above-identied patents, to use liquid damping of pendulums, etc., but this requires a complex sealing arrangement to prevent fluid leakage and consequent greater cost of manufacture.

It is an object of this invention to provide an inclinometer for an apparatus, such as a vehicle, indicating orientation of structure of such apparatus with respect to vertical.

It is a further object of this invention to provide such an inclinometer which displays, preferably in digital form, the degrees and increments of degrees of the orientation of a lift truck mast with respect to a true vertical gravitional plumb line for use by the lift truck operator for adjusting the orientation of the mast with respect to vertical.

A still further object of this invention is to provide such a digital inclinometer which can provide precise, accurate and easily determinable alignment of a lift truck mast to control load orientation when picking up, depositing, or carrying same, and particularly, for precisely orienting the mast of a specialized lift truck used for glass handling.

Another object of the invention is the provision of such a digital inclinometer which is not prone to errors resulting from aging of components, drift, or out-of-tolerance conditions, offset errors, and so forth, providing at all times a precise digital display of mast inclination.

Another object of the invention is the provision of such a digital inclinometer utilizing a sensor which is not prone to oscillation and which is inherently self-damping.

A further object of the present invention is the provision of such a digital inclinometer which is constructed of an absolute minimum of mechanical and moving components, which utilizes relatively few simple, lost cost optical sensing elements for sensing inclination and which provides solid state electronic conversion of the sensed inclination for use in displaying the inclination digitally.

Other objects of the invention include the provision of such a digital inclinometer which is rugged and reliable in usage; which is relatively immune from damage due to vibration, shock, or acceleration; which provides reliable display of inclination; and which gives to the operator automatic indication of any condition of excessive inclination which could not be electronically sensed and displayed.

Other objects and features will be in part apparent and in part pointed out hereinbelow.

BRIEF DESCRIPTION OF THE DRAWINGS

Corresponding reference characters indicate corresponding elements throughout the several views of the drawings.

DESCRIPTION OF THE PREFERRED EMBODIMENT

Figure 1:
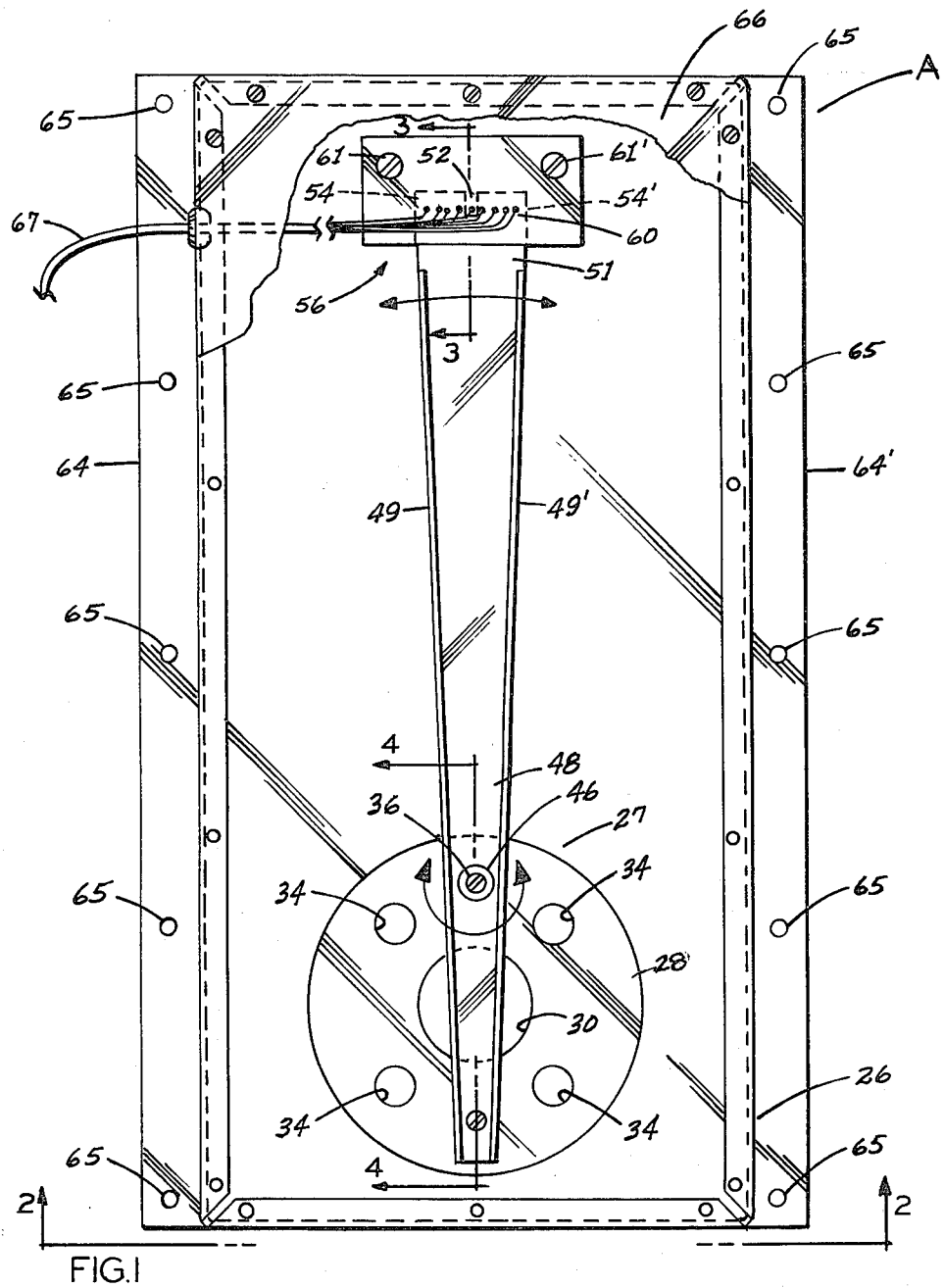
FIG. 1 is a front elevation of a sensor module, depicting an enclosure of the module having a cover partly broken away, of a lift truck digital inclinometer constructed in accordance with and embodying the present invention.
Figure 2:
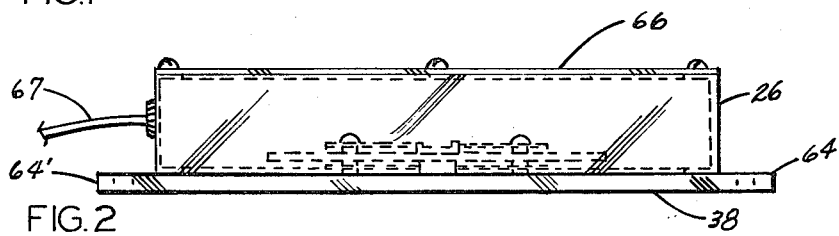
FIG. 2 is a top elevation of the sensor module of FIG. 1 as taken along line 2—2 of FIG. 1.
Figure 9:
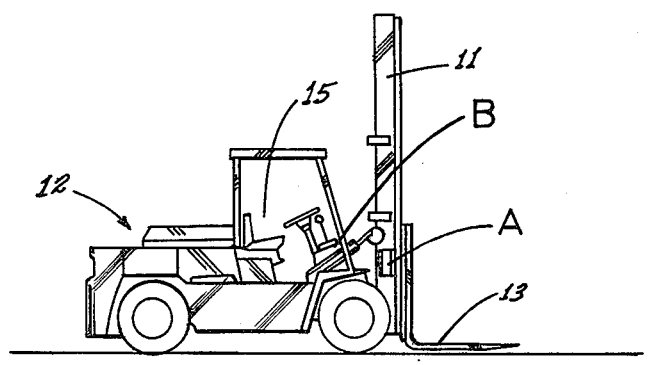
FIG. 9 is a side elevation of a conventional type of lift truck equipped with a digital inclinometer of the present invention.
Figure 10:
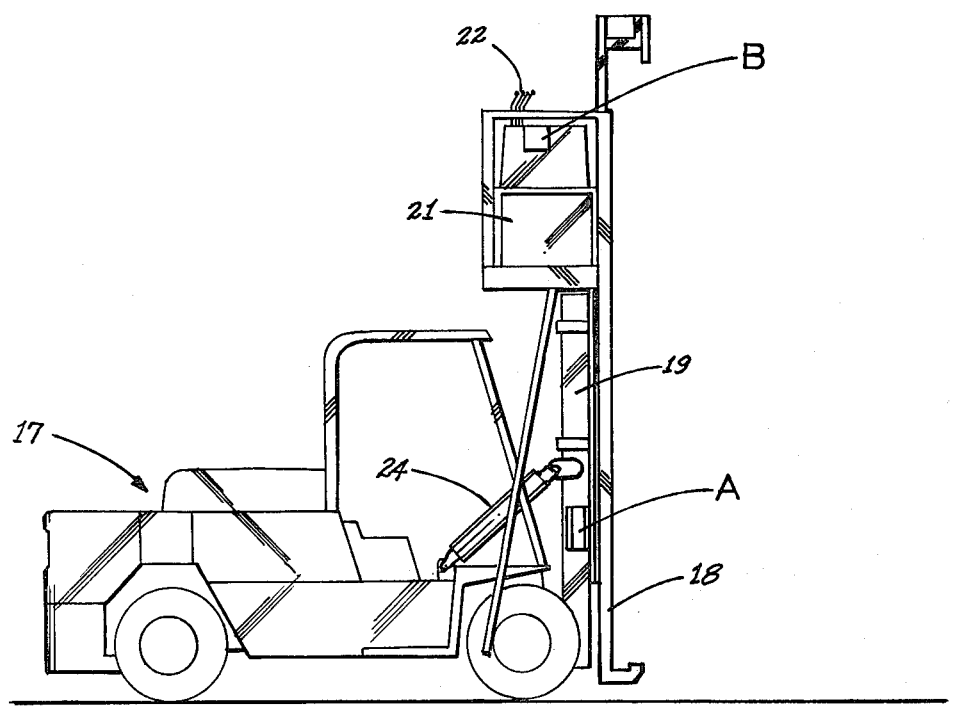
FIG. 10 is a side elevation of a specialized glass handling type of lift truck equipped with a digital inclinometer of the present invention.

Referring now by reference characters to the drawings, designated generally at A in FIG. 1, and in FIGS. 9 and 10 is an inclination sensor module which is secured to the mast 11 of a lift truck. In FIG. 10, lift truck designated generally at 12 is a conventional type of truck having a pair of lift forks 13 which are hydraulically or electrically controlled to be raised by mast 11 under control of an operator at an operating position or station 15. By use of conventional controls, mast 11 may be tilted forward or backward by the operator to a selected angle with respect to vertical, within a given range.

Module A is an inertial angle sensor adapted for sensing the actual inclination from a true vertical gravitational plumb line and, thus, determining verticality of the mast with respect to an imaginary line directed from sensor A to the center of gravity of the earth. The securement of module A to mast 11 as shown in FIG. 9 is merely representative of various possible locations at which the module may be secured to structure of a lift truck or other vehicle.

In FIG. 10, a specialized type of lift truck is designated generally at 17, being representative of the type of lift truck designated generally at 17, being representative of the type used for glass handling, i.e., for the transporting of packages of glass sheets by nestling of same aganst a pad upright support mechanism 18 carried by a lift or mast 19 comparable to mast 11 of lift truck 12. Mast 19 is selectively controllable by an operator standing upon a station or so-called bridge 21 constituting an operator station for control of the truck and its lift and handling mechanism as by controls 22. On bridge 21, the operator is provided with exceptional visibility of the load and surrounding work areas to assure safe, secure handling of the packages without glass damage. Mast 19 may selectively be tilted forward or backward by a hydraulic cylinder 24 under operator control 24.

In accordance with the invention, the operator is provided with a display module B, the circuitry of which is illustrated in FIGS. 5–8. Said module B provides a digital readout or display of the actual degrees and increments of degrees from the true vertical gravitational plumb line of the vehicle structure to which sensor module A is attached. Thus, in FIG. 9, the inclination with respect to vertical of mast 11 is indicated to the operator at station 15. In FIG. 10, module B displays the inclination of mast 19 to the operator on bridge 21.

Various possible specialized lift truck or other vehicular arrangements making use of the invention are envisioned but, in all proposed modes of usage, the digital inclinometer of the invention provides to the operator with a precise, accurate and easily determinable indication of the relative verticality of the structure to which sensor module A is attached. For example, this allows the operator of lift truck 17 to control load orientation when picking up, depositing, or carrying packages by permitting precise orientation of mast 19 by accurate presentation of the mast inclination in a digital form allowing the operator to easily understand and effectively utilize the mast inclination valve displayed.

In this regard, it is found that the digital display is superior in glass handling to analog display since the operator can more readily determine whether the sheets of glass and packages of same are oriented by tilting of mast 19 within a predetermined tolerance which has been established as permissible, such as within ±0.5° of vertical.

To this end, display module B is adapted for providing a plurality of digits for display of a range of inclination, thus indicating alignment in actual degrees and increments of degrees from a true vertical gravitational plumb line such as, for example, "+3.5°", "−1.5°", "+0.5°", "0.0 °", up to a maximum range such as ±8° for the embodiment illustrated. But, it is to be understood that an inclinometer can be configured in accordance with the invention to provide for a greater range of sensing and display.

Referring again to FIG. 1, sensor A comprises a suitable housing 26 for enclosing a pendulum 27 in the form of a flat disc 28. Disc 28 is pivoted by a ball bearing pivot to provide a pivot axis transversely extending through the disc above its center. The pivot axis is thereby parallel to a line drawn perpendicularly to the plane of the disc and extending through the center of the disc, which is actually in the form of annulus by virtue of a large central aperture 30 therein.

Figure 3:
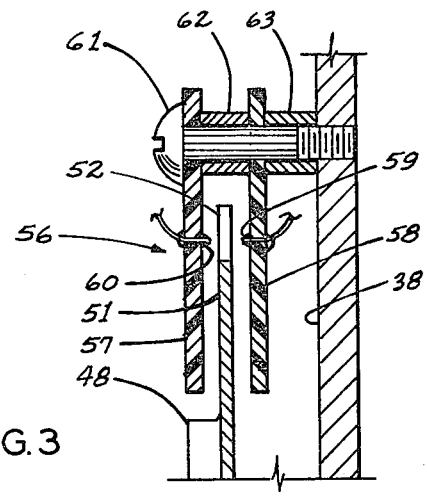
FIG. 3 is a vertical cross section taken along line 3—3 of FIG. 1, showing a photosensor arrangement of the invention.
Figure 4:
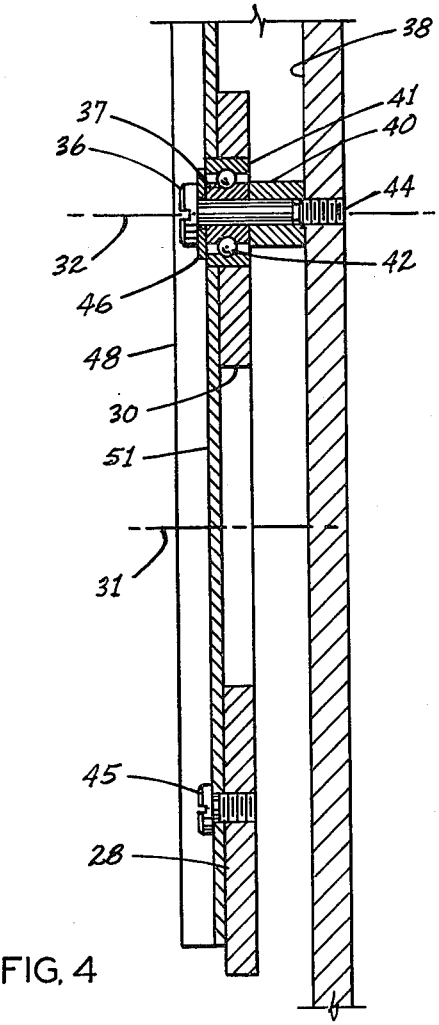
FIG. 4 is a similar vertical cross section taken along line 4—4 of FIG. 1, illustrating a pendulum of the sensor.

In FIG. 3, the center of the disc is shown by an axis 31 and the pivot axis being shown at 32. Also, for proper weighing and balancing of the disc, it may be provided with a plurality of apertures, as at 34, to selectively redistribute and reduce the mass of the disc.

The pivot is defined by a mounting screw 36 carrying a sleeve 37 spaced from a rear wall 38 of enclosure 36 by a spacer 40. A sleeve 41 pressed into disc 28 rotates upon ball bearings 42 surrounding sleeve 37. Screw 36 may be threaded into a bore 44 of plate 38 but such is merely illustrative of various possible mounting arrangements.

Secured to disc 28 at its lower end by a screw 45 and a washer 46 under the head of screw 36 is a wand 48 formed of flat metal sheet material having outwardly directed flanges 49, 49' on opposite edges which diverge in the direction away from disc 28 to provide a disc remote upper end 51 of the wand free of said flanges 51 and having a notch 52 therein centered between side edges 54, 54'. These side edges are not flanged.

The distance from the pivot to the disc-remote end 51 of wand 48 is much greater than the diameter of disc 28 thereby providing exaggerated movement in response to the center of gravity of the disc (which coincides with its center) with respect to pivot axis 32. Said disc-remote wand end 51 controls the incidence of light upon a plurality of light responsive devices which are, in accordance with the invention, illuminated by at least one light source, and, preferably, individual light sources, all as described shortly, forming part of a light sensor assembly designated generally at 56.

Oscillation of disc 28 and wand end 51 is substantially minimized since pivot axis 32 is located analytically with respect to disc center or axis 31 for yielding a relatively rapid harmonic motion, i.e., shortest period of oscillation. Bearing friction of the pivot, though very small, also helps dampen oscillations without interfering with accuracy. Other oscillation damping can be employed, e.g., by use of magnets, such as located proximate wand 48.

Assembly 56 comprises first and second boards 57, 58 which may be of phenolic, epoxy, or other resin materials used, for example, for making printed circuit boards (PCB's). On one of said boards 57 is positioned a linear array 59 of individual phototransistors which are spaced evenly across the board. On the opposite board 57 is located a corresponding linear array 60 of light-emitting diodes (LED's). Arrays 59, 60 are transversely aligned with respect to wand 48 in parallel relationship to pivot axis 32 whereby slot 52 will allow light from one of the LED's to be directed upon its corresponding phototransistor throughout the range of movement of wand 48 about pivot axis 32 in accordance with the inclination of housing 26 to the true vertical gravitational plumb line defined by disc 28 as it is attracted to the mass of the earth.

In accordance with this invention, the width of slot or aperture 52 is precisely selected to be substantially or slightly greater than the spacing between adjacent phototransistors so that it will permit illumination of only one phototransistor by its corresponding LED being thus choosen to be substantially the same as the spacing between the phototransistors of the array. Also, the width of the disc-remote portion 51 is precisely selected so that its side edges 54, 54' permit successive phototransistors to be illuminated upon movement of wand 48 about the pivot axis, all as more fully described hereinbelow.

Boards 57, 58 are maintained in position on opposite faces of wand end 51 by a pair of screws 61, 61' and spacers 62, 63. The screws are threaded into the rear wall or plate 38.

Enclosure 26 is provided, merely representatively of one possible construction, with flanges 64, 64' which are apertured, as at 65, to permit securement to housing 26 as by machine screws to the mast of a lift truck. Preferably, also the entire pendulum and light sensor assembly is rendered accessible by a cover plate 66 of enclosure 26. Extending from housing 26 is a cable 67 including leads interconnected with the LED's and phototransistors and connecting module A with module B.

Although there could be located within housing 26 all of the circuitry necessary for providing signals for driving a numeric display of module B, it is preferred instead that substantially all such circuitry be located within housing B.

Figure 5:
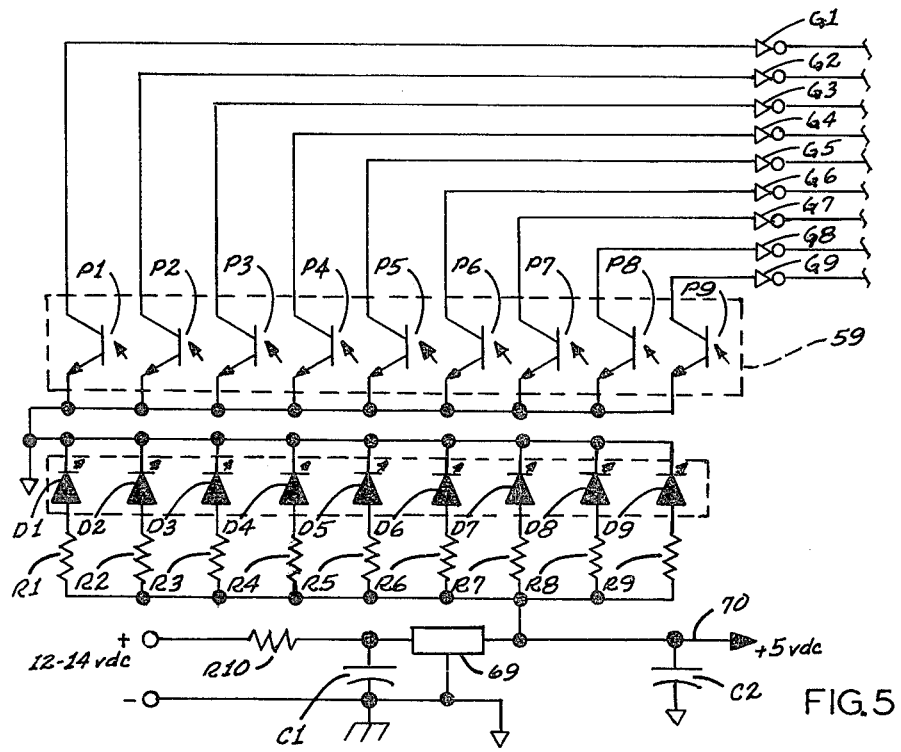
FIGS. 5–8 together constitute a schematic circuit diagram of certain photosensing, logic and display drive circuitry of the invention, interconnections between the various figures being shown by the alignment of leads.
Figure 8:
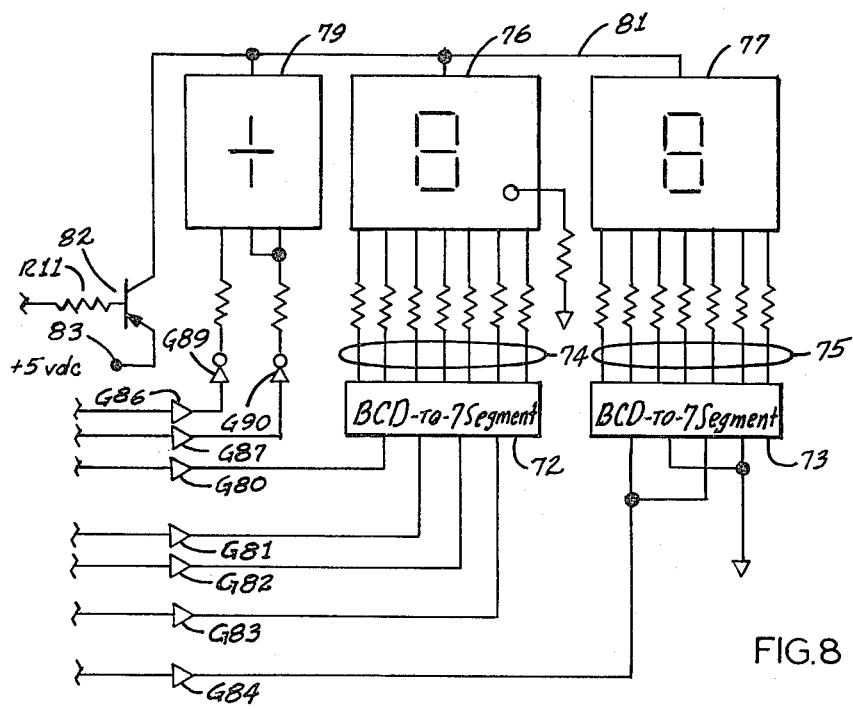

Circuitry of the invention is illustrated schematically in FIGS. 5-8. Referring to FIG. 5, the light sensor assembly 56 circuit of phototransistor array 59 has nine phototransistors P1-P9. These are each adapted to be illuminated by a corresponding one of nine LED's D1-D9 each having its anode tied to ground and its cathode supplied through a corresponding one of resistors R1-R9 with suitable voltage, such as 5 v.d.c. from a power supply having an integrated circuit regulator 69 to which standard vehicle voltage, such as 12 v. is provided. Filter capacitors C1 and C2 are connected across the input and output of regulator 69. Its +5 v.d.c. output is made available also to logic circuitry of the system but for simplicity and clarity not all power supply connections are illustrated.

The emitter of each of phototransistors P1-P9 is connected to the circuit ground, the collector being connected to a respective one of nine logic inverting gates or buffers G1-G9. The output of each of gates G1-G9 are interconnected with a respective one of buses L1-L9 (FIGS. 6 and 7) serving as inputs for a logic circuitry including logic AND gates G11-G64, logic inverting (NOT) gates G66-G70, and logic NOR (AND NOT) gates G72-G78. This logic circuitry decodes signals present on leads L1-L9 to provide corresponding binary coded decimal (BCD) signals on a plurality of output buses L11-L15 (FIG. 6) and L16 (FIG. 7) via diodes D11-D73 which serve as OR gates to encode signals on leads L11-L16. Having inputs connected to leads L11-L17 are integrated circuits 72, 72' each of which may be a commercially available type of BCD-to-7-segment converter for providing on their collective outputs 74, 75 drive signals through current limiting resistors for driving respective 7-segment numeric displays 76, 77, such as of the LED, fluorescent, plasma, or incandescent types.

Display 76, preferably, shows the number of degrees of inclination and display 77 the increments of degrees such as tenths of degrees. A polarity display 79 indicates either a positive or negative sign for revealing whether the mast is tilted forward or rearward, if other than at zero inclination.

Buses L11-L17 are connected with the BCD inputs of circuits 72, 73 through drivers or buffers G80-G84. Similar drivers G86-G87 provide signals on buses L11 and L17 to logic inverting (NOT) gates G89, G90 which have outputs connected through current limiting resistors to the polarity display 79. For polarity determination, the odd numbered diodes, viz., diodes D47, D49, D51, etc. all have their cathodes interconnected with the anode of a diode D83 whose cathode is in turn connected to bus L11.

As previously observed, slot 52 provides illumination by one LED of a single phototransistor P5 when wand 48 is centered with respect to array 56 corresponding to a position of disc 28 which exists in a condition of zero degrees of inclination. Note that this condition is such that a line drawn from the center of slot 52 through pivot axis 32 and will intersect the beam of light between LED D5 and phototransistor P5. Because the width of slot 52 is substantially precisely the same as the spacing between the individual phototransistors, a movement of the wand corresponding to a half of the width of the slot in either direction will permit the adjacent phototransistor to be illuminated. Thus, if wand end 51 moves to the right by rotation about pivot axis 32 in an amount corresponding to one half slot width, the adjacent phototransistor P6 will be illuminated with P5. A successive half slot increase in the angle will prevent illumination of P5 and provide illumination only of P6. Furthermore, the width of remote end 51, i.e., the dimension between its edges 54, 54', is such that when slot 52 provides illumination of the center phototransistor P5 and either phototransistor (P4 or P6) on either side, the corresponding edge 54, 54' permitting the illumination of the corresponding other end photocell (P1 or P9) of the array. Each phototransistor when illuminated may be said to be conductive or "on". Thus, if slot 52 permits P5 and P6 to be on, then P1 will also be on. If then wand end 51 moves another half slot width to the right, P1 will remain on with P6, but light will be blocked by the left edge of slot 52 from P5, so that only P1 and P6 are on. With subsequent further half slot movement to the right, P6 and P7 will be illuminated together with P2, and so on.

Therefore, it is to be understood that the phototransistors P1-P9 are each at all times either on or off, depending upon whether the slot 52 and either edge 54, 54' of wand end 51 will permit illumination of same. This permits the use of nine photocells to measure an included angle of 18° (which as noted will provide a display of ±8°) in degrees and 5/10ths of degrees. Accordingly, the dimensions of wand 48 are chosen to provide spacing of the photocells of array 59 in 1° increments and the width of slot 52 corresponds to 1° of rotation about axis 32. It follows that a rotation of wand 48 by $4\frac{1}{2}°$ about axis 32 will provide positioning of slot 52 for uncovering the last element (P1 or P9) of array 59. In such position, the corresponding side edge, 54, 54' would be aligned with the last element (P9 or P1) of the array and the opposite side edge would be uncovering the center phototransistor P5. In effect, slot 52 measures half degree increments. But, with increase in movement beyond $4\frac{1}{2}°$, the wand would continue to cover remaining elements in array, such as P6, P7, P8, and P9 for measurement in terms of 1° increments.

In effect, the phototransistor array 59 is used to encode the position of wand 48. In so doing, phototransistors P1–P9 provide signals on buses L1–L9 constituted by a voltage on the respective bus when the corresponding photocell is on. Table I summarizes the decoding of these signals by the various logic gates of the circuitry of FIGS. 6 and 7.

Figure 6:
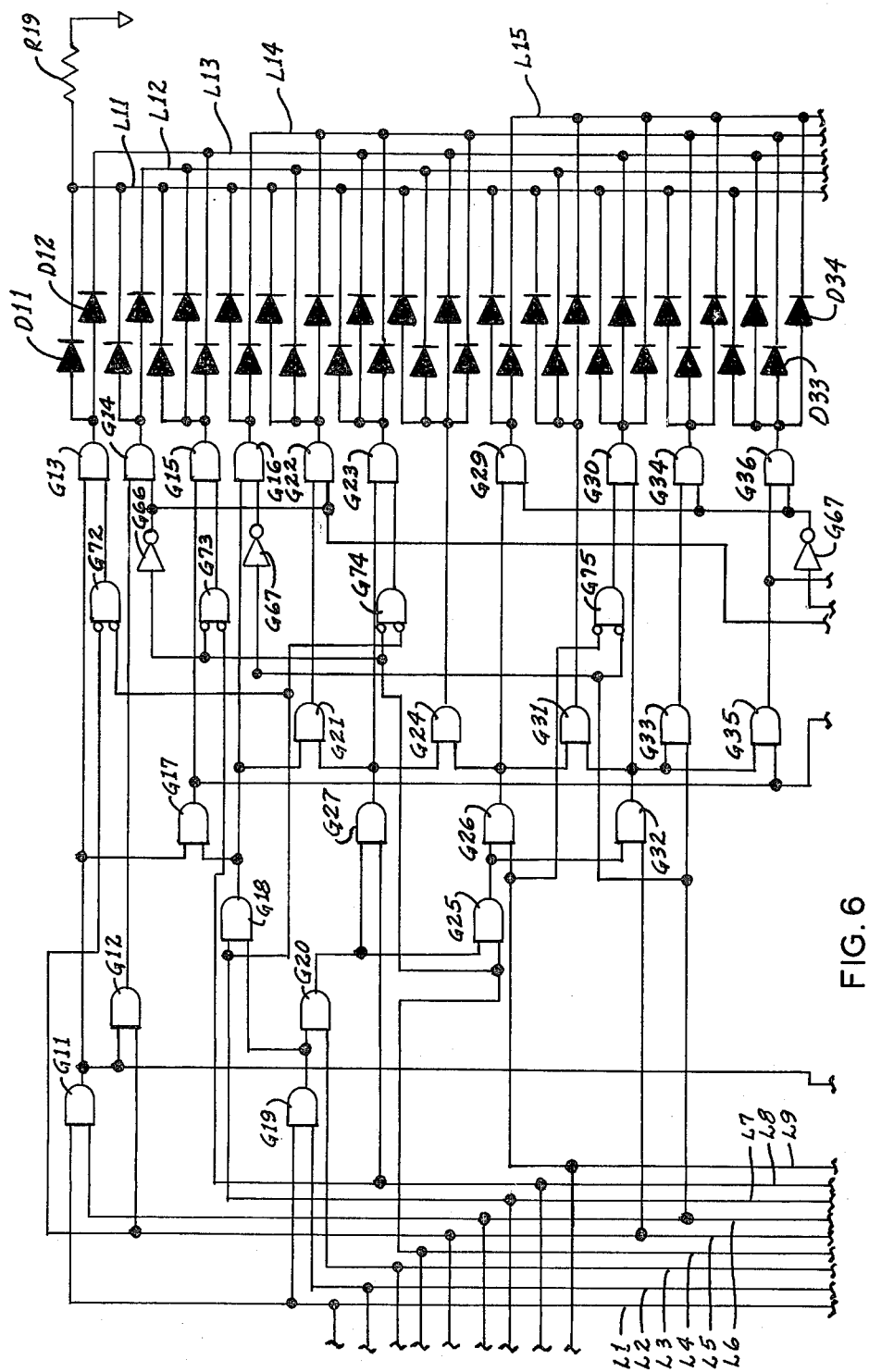
Figure 7:
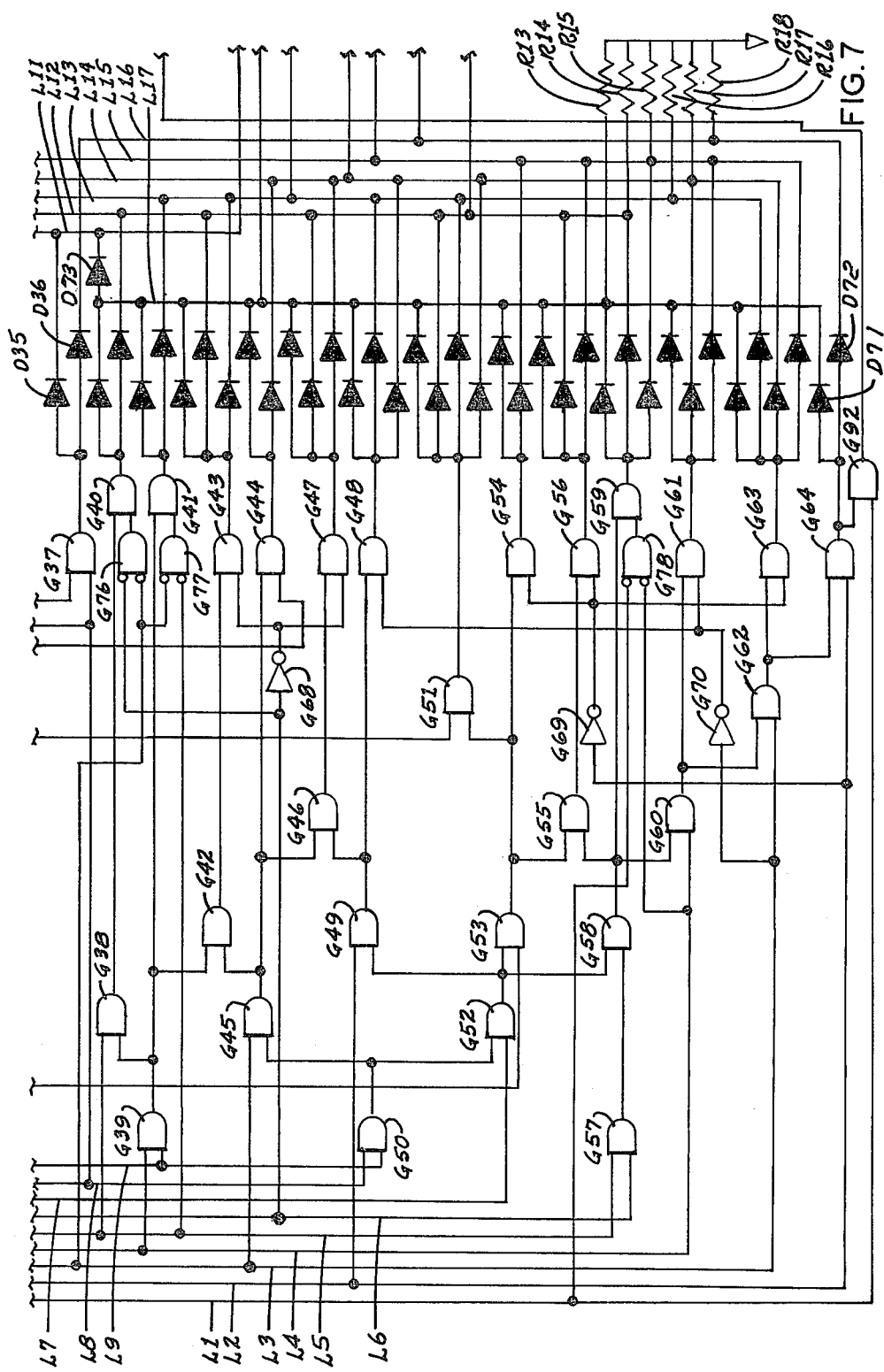

Table II summarizes the signals developed by logic gates of the circuitry of FIGS. 6 and 7, which signals represent the decoding of inputs provided by array 59 expressed in terms of degrees of inclination, as represented by the signal present at the output of each gate identified in Table II.

Diodes D11–D73 provide these output signals upon buses L11–L17 so that there result BCD signals on these buses.

For example, if photocells P3–P9 are on, there would result at the output of gate G63 a signal corresponding to +7° of inclination. Diodes D73–D76 would cause a logic high or "1" to be present on buses L17, L13, L14, and L15 which, through the drivers G80–G84, etc., provide BCD inputs to circuits 72, 73 representing the BCD values "1", "2", and "3" which sum to "7". Circuit 72 causes the numeral "7" to be displayed by display device 76. Also, the signals present on buses L11, L17 cause polarity display 79 to indicate "+".

It is, thus, seen that diodes D11–D73 constitute means for converting the decoded inclination values to BCD format, thereby encoding the inclination in BCD values.

TABLE I

| GATE | LOGIC OUTPUT |
| --- | --- |
| G11 | 1.6 |
| G12 | 1.5.6 |
| G17 | 1.2.6.7 |
| G18 | 1.2.7 |
| G20 | 1.2.3 |
| G21 | 1.2.3.7.8 |
| G24 | 1.2.3.4.8.9 |
| G25 | 1.2.3.4 |
| G26 | 1.2.3.4.9 |
| G31 | 1.2.3.4.5.9 |
| G32 | 1.2.3.4.5 |
| G33 | 1.2.3.4.5.6 |
| G35 | 1.2.3.4.5.6.7 |
| G38 | 4.5.9 |
| G39 | 4.9 |
| G42 | 3.4.8.9 |
| G45 | 3.8.9 |
| G46 | 2.3.7.8.9 |
| G51 | 1.2.6.7.8.9 |
| G52 | 7.8.9 |
| G53 | 1.6.7.8.9 |
| G57 | 5.6 |
| G58 | 5.6.7.8.9 |
| G60 | 4.5.6.7.8.9 |

TABLE II

| GATE | INCLINATION VALUE REPRESENTED BY OUTPUT |
| --- | --- |
| G13 | −1.0 |
| G14 | −0.5 |
| G15 | −1.5 |
| G16 | −2.0 |
| G22 | −2.5 |
| G23 | −3.0 |
| G24 | −3.5 |
| G29 | −4.0 |
| G31 | −4.5 |
| G30 | −5.0 |
| G34 | −6.0 |
| G36 | −7.0 |
| G37 | −8.0 |

TABLE II-continued

| GATE | INCLINATION VALUE REPRESENTED BY OUTPUT |
| --- | --- |
| G40 | +0.5 |
| G41 | +1.0 |
| G43 | +1.5 |
| G44 | +2.0 |
| G47 | +2.5 |
| G48 | +3.0 |
| G51 | +3.5 |
| G54 | +4.0 |
| G56 | +4.5 |
| G59 | +5.0 |
| G61 | +6.0 |
| G63 | +7.0 |
| G64 | +8.0 |

In Table I, the heading "Gate" indicates that logic element or gate of FIGS. 6 and 7 providing logic operation upon the signals present on buses L1–L9 (which correspond to the phototransistors P1–P9). The heading "Logic Output" indicates the nature of the output signal provided at the output of the respective gate as a function of the signals present on buses L1–L9 as signified by the numerals one through nine.

These logic outputs are effectively provided by the diode array consisting of diodes D11–D73 to buses L11–L17 as encoded BCD signals for providing digital representation of the inclination measured by sensor A. These BCD signals are then converted to drive signals at the outputs 74, 75 of circuits 72, 73 to cause proper energization of the display devices 76, 77. Also, the polarity signals present on buses L11–L17 similarly are provided to polarity display 79, being logically inverted by gates G89, G90 for proper operation. The common cathodes of each of display devices 76, 77, and 79 are tied together by a common lead 81 which is connected through the collector-emitter circuit of a transistor 82 for controlling the availability of the +5 v.d.c. supply potential requisite for operation of these devices and which potential is made available by a terminal 83 connected to the power supply previously described. A resistor R11 connects the base of transistor 82 to a further AND gate G92 which receives as its inputs the output of gate G64 and the signal present on bus L1. This arrangement provides means for causing the display to provide an overrange indication if the vehicle structure to which sensor A is secured is inclined with respect to the vertical plumb line to a predetermined extent preventing the logic circuitry from providing proper digital encoding or conversion of the signals provided by phototransistors P1–P9, i.e., which may result if the end 51 of wand 48 should be displaced by an amount preventing array 59 from properly encoding the wand position. In operation, the overrange circuitry, by causing transistor 82 to become nonconductive, interrupts the supply potential for blanking display devices 76, 77, and 79. In this way, the operator is provided with an overrange signal permitting him to position the lift truck mast, for example, more closely to vertical at which time the digital display will again be resumed.

It is noted that CMOS devices may be utilized in constructing logic circuitry of the invention. For this reason, resistors R13–R18 provide connection of individual ones of buses L12–L16 to the circuit ground so that a logical low state will exist for the cathodes of the diodes D11–D73 for proper driving operation by buffers G80–G94, etc. A single resistor R19 provides the same function for bus L11 (FIG. 6).

Accordingly, it will be seen that several objects of the invention are attained and various other advantages also result.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. Apparatus for displaying inclination from vertical of a lift truck mast or other vehicle structure, said apparatus comprising an inclination sensor module carried by said mast and an inclination display module remote from said mast for displaying to an operator the inclination of said mast, and characterized by said sensor module including a mass for inertially establishing a true vertical gravitational plumb line, means for pivotally securing said mass by providing a pivot axis extending through said mass for permitting pivoted movement thereof with respect to said mast with a minimized total period of oscillation, means for optically detecting the position of said mass relative to said mast, and means for converting the optically detected position to electronic signals to produce encoded signals, said display module comprising a display device responsive to said encoded signals providing display of the actual degrees and increments of degrees of inclination of said mast referenced to said vertical plumb line.

2. Apparatus for providing a digital display of the inclination from vertical of a lift truck or other vehicular structure, said apparatus comprising an inclination sensor module carried by said structure and a digital display module remote from said structure for digitally displaying to an operator the inclination of said structure, and characterized by said sensor module including a mass pivotally secured with respect to said structure for inertially establishing a true vertical gravitational plumb line, means for optically detecting the position of said mass relative to said structure, means for converting the optically detected position to electronic position signals, means for decoding said electronic position signals to produce encoded signals, said display module comprising a digital display device responsive to said encoded signals providing display of the actual degrees and increments of degrees of inclination of said structure referenced to said vertical plumb line.

3. Apparatus according to claim 2 and further comprising means providing pivotal securement of said mass for pivotal movement relative to said structure about a pivot axis in response to inclination of said structure.

4. Apparatus according to claim 3 and further characterized by said pivot axis extending through said mass in perpendicular relationship to a plane defined by said mass.

5. Apparatus according to claim 4 and further characterized by said mass comprising disc, said pivot axis being located analytically in spaced relationship to the center of said disc by a dimension less than the radius of said disc for yielding a relatively rapid harmonic motion of said disc, thereby tending to minimize the total period of oscillation.

6. Apparatus according to claim 3 and further characterized by said mass having a wand extending therefrom including a mass-remote end providing exaggerated movement upon rotation of said mass relative about said pivot axis, said means for optically detecting the position of said mass comprising an array of photosensitive devices positioned relative to said mass-remote wand end for detecting the position thereof relative to said structure, and means for illuminating said devices as a function of the position of said wand end.

7. Apparatus according to claim 6 and further characterized by said array of photosensitive devices comprising a linear array of individual light responsive switching devices, said illuminating means comprising a linear array of LED's transversely aligned with said light responsive switching devices, said wand end being movable about said pivot axis between said arrays for controlling the incidence of light from said LED's upon corresponding ones of said light responsive switching devices to produce electronic position signals from said switching devices.

8. Apparatus according to claim 6 and further characterized by said sensor module comprising a substantially closed enclosure containing said disc, wand, and array of photosensitive devices.

9. Apparatus according to claim 8 and further characterized by said light responsive switching devices comprising phototransistors and being less in number than the total number of degrees and increments of degrees of inclination to be displayed.

10. Apparatus according to claim 9 and further characterized by said wand having a light blocking portion having side edges and width between said side edges sufficient for blocking light from all of said LED's to all said phototransistors for zero inclination of said structure, said portion having a centrally located aperture permitting illumination of a center one of said phototransistors, said aperture and side edges sequentially permitting incidence of light from the LED's on corresponding phototransistors upon position change of said wand end with respect to said array.

11. Apparatus according to claim 10 and further characterized by said aperture having a width in the direction of movement at least substantially equal to or slightly greater than the spacing between each of said phototransistors.

12. Apparatus according to claim 11 and further characterized by said phototransistors being spaced apart by a distance corresponding to movement of said wand aperture through one degree of rotation about said pivot axis, said width of the wand end being such that rotation of said wand through one-half degree of rotation about said pivot axis from zero inclination will cause illumination of an adjacent phototransistor at the end of said array.

13. Apparatus according to claim 6 and further characterized by said means for converting optically detected position to electronic position signals comprising circuitry interconnected with said light responsive switching devices for producing voltages corresponding to conductive and nonconductive states of said devices, said decoding means comprising logic circuitry including a plurality of logic gates for providing outputs which are a logical function of said conductive and nonconductive states.

14. Apparatus according to claim 13 and further characterized by said logic gates providing inclination output signals representing values of said inclination expressed in degrees and increments of degrees to produce said encoded signals.

15. Apparatus according to claim 14 and further characterized by said logic circuitry comprising means for converting said inclination output signals to BCD encoded signals.

16. Apparatus according to claim 15 and further characterized by said display devices comprising 7-segment devices and further comprising BCD-to-7-segment converting means for causing display by said display devices in accordance with said BCD encoded signals.

17. Apparatus for providing a digital display of the actual degrees and increments of degrees of inclination from a true vertical gravitational plumb line of a lift truck mast, said apparatus comprising an inclination sensor module carried by said mast and a display module remote from said mast for providing said digital display to an operator, and characterized by said inclination sensor module including an enclosure adapted for securement to said mast, a pendulum positioned within said closure, said pendulum comprising a mass, a pivot defining a pivot axis extending through said mass for permitting swinging within said enclosure upon inclination of said mast from said vertical plumb line, said pivot axis being spaced from the center of said mass whereby a part of said mass is located above said pivot axis and a part of said mass is located below said pivot axis, and such that the center of gravity of said mass is located beneath said pivot axis, a wand extending from said mass and having mass-remote end providing exaggerated movement in response to movement of the center of gravity of said mass with respect to said pivot axis, a plurality of light responsive devices positioned with respect to the mass-remote end of said wand for detecting the position of said wand, said light responsive devices being fewer in number than the number of degrees and increments of degrees to be displayed, at least one light source for providing illumination for being received by said light responsive devices, said mass-remote end of said wand being configured to cause different ones of said light responsive devices to be illuminated in a predetermined pattern in response to pivoting of said mass about said pivot axis upon increase in the degree of inclination of said mast from said vertical plumb line, circuit means interconnected with said light responsive devices for providing decoding of signals from said light responsive devices resulting from said predetermined pattern of illumination to produce an encoded signal representative of the actual inclination of said vertical mast from said vertical plumb line, said display module comprising a plurality of digital display devices defining a numeric readout having a plurality of digits for indicating said actual degrees and increments of degrees of inclination, and means for converting said encoded signal to display drive signals for driving said display devices thereby to cause display by said digital readout by the actual degrees and increments of degrees of inclination of said mast from said vertical plumb line.

18. Apparatus as set forth in claim 17 and further characterized by means for causing said display to provide an overrange indication if said mast is inclined with respect to said vertical plumb line to a predetermined extend preventing said circuit means from properly digitally encoding said signals from said light responsive devices.

19. Apparatus as set forth in claim 17 and further characterized by said mass defining a plane, said pivot axis extending through said mass in perpendicular relationship to said plane, said mass inertially establishing said true vertical gravitational plumb line.

20. Apparatus as set forth in claim 19 and further characterized by said mass comprising a disc, said pivot axis being located analytically in spaced relationship to the center of said disc by a dimension less than the radius of said disc for yielding a relatively rapid harmonic motion of said disc thereby to substantially minimize the total period of oscillation.

21. Apparatus as set forth in claim 17 and further characterized by said enclosure containing said mass, said wand, said light responsive devices, said light source, and said apparatus comprising a further enclosure constituting said display module and containing said circuit means and said digital display devices, said further enclosure being located at an operator station of said lift truck.

* * * * *